US 8,498,802 B2

(12) United States Patent
Yamamoto

(10) Patent No.: US 8,498,802 B2
(45) Date of Patent: Jul. 30, 2013

(54) VEHICLE DRIVE CONTROL APPARATUS

(75) Inventor: Shinsuke Yamamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 97 days.

(21) Appl. No.: 12/967,258

(22) Filed: Dec. 14, 2010

(65) Prior Publication Data

US 2011/0082624 A1 Apr. 7, 2011

Related U.S. Application Data

(63) Continuation of application No. PCT/JP2009/002029, filed on May 8, 2009.

(51) Int. Cl.
*G06F 19/00* (2011.01)
*G06G 7/70* (2006.01)
*A01B 69/00* (2006.01)
*B62D 5/00* (2006.01)
*B62D 11/00* (2006.01)
*B62D 12/00* (2006.01)

(52) U.S. Cl.
USPC ............................................. 701/112; 701/41

(58) Field of Classification Search
USPC ................. 701/41, 70–76, 78, 79, 81, 82, 90, 701/91, 93, 96, 110, 112, 113, 117, 124, 701/86; 475/2, 18–30; 477/10, 19, 99, 175–179; 180/6.2, 6.54, 116–119, 234, 408–410, 443–446; 188/350; 280/5.5–5.513
See application file for complete search history.

(56) References Cited

U.S. PATENT DOCUMENTS

| 4,414,937 | A | * | 11/1983 | Ueda et al. ................ 123/198 D |
| 4,416,230 | A | * | 11/1983 | Katayose et al. ............. 123/325 |
| 4,930,592 | A | * | 6/1990 | Ohmura ........................ 180/445 |
| 5,748,474 | A | * | 5/1998 | Masuda et al. ................. 701/90 |
| 5,948,028 | A | * | 9/1999 | Raad et al. ....................... 701/37 |
| 6,052,644 | A | * | 4/2000 | Murakami et al. .............. 701/93 |

(Continued)

FOREIGN PATENT DOCUMENTS

| CA | 2398012 C | * | 1/2006 |
| JP | 2001-12272 | | 1/2001 |

(Continued)

OTHER PUBLICATIONS

International Preliminary Report on Patentability and Written Opinion issued Nov. 9, 2011 in Application No. PCT/JP2009/002029 (With English Translation).

*Primary Examiner* — Khoi Tran
*Assistant Examiner* — Abby Lin
(74) *Attorney, Agent, or Firm* — Oblon, Spivak, McClelland, Maier & Neustadt, L.L.P.

(57) ABSTRACT

In a vehicle drive control apparatus, a behavior determination unit determines whether a vehicle behavior is in a stable state or an unstable state based on a vehicle turning behavior. An engine stop control unit avoids stopping the engine as automatic stop conditions are not satisfied when the vehicle behavior is determined to be in an unstable state during operation of the engine. When the vehicle behavior is in a stable state and other automatic stop conditions are satisfied during operation of the engine, the engine stop control unit stops the engine. During stability control performed by a stability ECU, the engine stop control unit avoids stopping the engine as the automatic stop conditions are not satisfied.

4 Claims, 6 Drawing Sheets

U.S. PATENT DOCUMENTS

| | | | |
|---|---|---|---|
| 6,324,458 B1 * | 11/2001 | Takagi et al. | 701/70 |
| 6,334,834 B1 * | 1/2002 | Mizutani et al. | 477/203 |
| 6,347,608 B1 * | 2/2002 | Hara et al. | 123/179.4 |
| 6,540,644 B2 * | 4/2003 | Morimoto et al. | 477/102 |
| 6,558,290 B2 * | 5/2003 | Phillips et al. | 477/5 |
| 6,719,098 B1 * | 4/2004 | Ishikawa et al. | 187/222 |
| 6,725,135 B2 * | 4/2004 | McKeown et al. | 701/32.4 |
| 6,742,498 B2 * | 6/2004 | Mabuchi et al. | 123/339.16 |
| 6,763,903 B2 * | 7/2004 | Morimoto et al. | 180/65.26 |
| 6,802,291 B2 * | 10/2004 | Ujifusa | 123/179.4 |
| 7,146,958 B2 * | 12/2006 | Asakawa et al. | 123/179.16 |
| 7,398,148 B2 * | 7/2008 | Yoshioka et al. | 701/103 |
| 2002/0075139 A1 * | 6/2002 | Yamamoto et al. | 340/436 |
| 2004/0215385 A1 * | 10/2004 | Aizawa et al. | 701/93 |
| 2005/0222744 A1 * | 10/2005 | Sakata | 701/70 |
| 2006/0048734 A1 * | 3/2006 | Kataoka et al. | 123/179.4 |
| 2006/0111825 A1 * | 5/2006 | Okada et al. | 701/48 |
| 2007/0225882 A1 | 9/2007 | Yamaguchi et al. | |
| 2008/0004780 A1 * | 1/2008 | Watanabe et al. | 701/54 |
| 2008/0010001 A1 * | 1/2008 | Lecole et al. | 701/112 |
| 2009/0182476 A1 * | 7/2009 | Sidlosky et al. | 701/72 |
| 2009/0241883 A1 * | 10/2009 | Nagoshi et al. | 123/179.4 |
| 2010/0025131 A1 * | 2/2010 | Gloceri et al. | 180/65.28 |
| 2010/0087294 A1 * | 4/2010 | Kamioka et al. | 477/179 |

FOREIGN PATENT DOCUMENTS

| | | |
|---|---|---|
| JP | 2001-32734 | 2/2001 |
| JP | 2002-213269 | 7/2002 |
| JP | 2002-219957 | 8/2002 |
| JP | 2003-35177 | 2/2003 |
| JP | 2003-138955 | 5/2003 |
| JP | 2004-166389 | 6/2004 |
| JP | 2008-19726 | 1/2008 |
| JP | 2008-510926 | 4/2008 |

* cited by examiner

FIG.9

| YAW RATE < SPECIFIED VALUE C1 |
| YAW RATE VARIATION AMOUNT FROM PREVIOUS VALUE < SPECIFIED VALUE C2 |
| LATERAL ACCELERATION < SPECIFIED VALUE C3 |
| LATERAL ACCELERATION VARIATION AMOUNT FROM PREVIOUS VALUE < SPECIFIED VALUE C4 |

FIG.10

| YAW RATE INCREASES FROM PREVIOUS VALUE |
| LATERAL ACCELERATION INCREASES FROM PREVIOUS VALUE |

FIG.11

| REMAINING AMOUNT OF POWER ≦ SPECIFIED VALUE D1 |
| REMAINING AMOUNT OF BRAKE NEGATIVE PRESSURE ≦ SPECIFIED VALUE D2 |

FIG.12

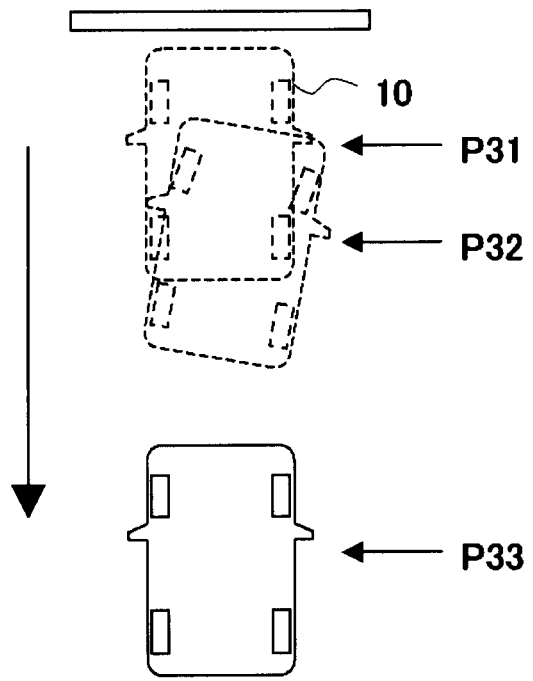

VEHICLE DRIVE CONTROL APPARATUS

BACKGROUND OF THE INVENTION

1. Field of the Invention

The present invention relates to a vehicle drive control apparatus, in particular, relates to a vehicle drive control apparatus to automatically stop or start an engine thereof.

2. Description of the Related Art

In these days of the increasingly important environmental issue, suppressing greenhouse effect gas exhausted from vehicles has been strongly desired. Recently, development of technology to suppress idling operation by automatically stopping an engine during vehicle stopping has been widely performed.

Following are examples of such technologies. A control apparatus for a hybrid vehicle to automatically restart an engine when amount of battery charge falls below a specified value during engine stopping has been proposed (see Patent Document 1, for example). Further, a technology to store behavior-related information at a storage portion along with map information when certain vehicle behavior is detected at some point and to reflect on vehicle control for passing through the same point through the same route has been proposed (see Patent Document 2, for example). Further, a technology to prohibit automatic starting of an engine as occurrence of vehicle collision being determined when the vehicle detects an impact of a specified value or higher has been proposed (see Patent Document 3, for example). Further, a technology to prohibit automatic starting of an engine during parking operation has been proposed (see Patent Document 4, for example). Further, a technology to forcedly start an internal combustion engine when negative pressure is not sufficiently ensured necessary for generating minimum desired assistance force by a brake booster has been proposed (see Patent Document 5, for example). Furthermore, a technology to prohibit automatic stopping of an engine, even if automatic stop conditions of the engine are established, when locking of a drive wheel is detected due to operation of an antilock braking system (ABS) and the like has been proposed (see Patent Document 6, for example).

[Patent Document 1] Japanese Patent Application Laid-open No. 2004-166389
[Patent Document 2] Japanese Patent Application Laid-open No. 2002-219957
[Patent Document 3] Japanese Patent Application Laid-open No. 2003-138955
[Patent Document 4] Japanese Patent Application Laid-open No. 2008-510926
[Patent Document 5] Japanese Patent Application Laid-open No. 2001-012272
[Patent Document 6] Japanese Patent Application Laid-open No. 2001-032734

SUMMARY OF THE INVENTION

For example, on a low-$\mu$ road such as an ice-covered road, there is a possibility that a behavior becomes unstable such that a vehicle moves in the lateral direction when the vehicle is about to be stopped or stopped at an inclined road. In such a state of an unstable behavior, there is a high possibility that steering is performed by a driver in order to correct a vehicle attitude. Presently, an electric power steering (EPS) is widely adopted for a number of vehicles. In the vehicle being provided with an EPS, large power is consumed when the driver steers a steering wheel in order to turn the vehicle at an extremely low speed or during stopping. Accordingly, when the engine is stopped for idling stop and the like in the state that a vehicle behavior becomes unstable as mentioned above, it becomes difficult to quickly charge power consumed by the EPS and the like.

To address the above issue, the present invention is devised to provide a state capable of appropriately supplying power to equipment which requires power even when a vehicle behavior is unstable in a vehicle having an engine capable of being automatically stopped or started.

MEANS FOR SOLVING THE PROBLEMS

In view of the above issue, a vehicle drive control apparatus includes an engine stop control unit which stops an engine when an automatic stop condition for automatically stopping the engine is satisfied during operation of the engine and a behavior determination unit which determines whether a behavior of a vehicle is a stable state or an unstable state. The engine stop control unit avoids stopping the engine as the automatic stop condition is not satisfied when the behavior of the vehicle is determined to be an unstable state during operation of the engine.

According to an aspect, a state capable of appropriately supplying power to equipment which requires power can be obtained by avoiding stopping of an engine when a vehicle behavior is unstable.

The behavior determination unit may determine whether the behavior of the vehicle is a stable state or an unstable state based on a turning behavior of the vehicle.

On a low-$\mu$ road as mentioned above, a vehicle is apt to be into a behavior unstable state of lateral moving. Such an unstable state of the vehicle due to lateral moving thereof is possible to be appropriately determined by utilizing a turning behavior of the vehicle. Therefore, according to the aspect, an unstable state of such behavior can be appropriately determined.

Here, a vehicle behavior control unit which controls a vehicle behavior may be further provided. The engine stop control unit may avoid stopping the engine during vehicle behavior control performed by the vehicle behavior control unit as the automatic stop condition is not satisfied.

When behavior control such as ABS and stability control is performed, there is a high possibility that a vehicle behavior is shifted from an unstable state to a stable state. Therefore, according to the aspect, frequency of avoiding automatic stopping of an engine caused by a vehicle being an unstable state can be suppressed. Accordingly, an engine can be automatically stopped appropriately, so that idling operation can be suppressed.

The engine stop control unit may stop the engine in the case that the vehicle is decelerated to or lower than a specified vehicle speed at which the engine is to be automatically stopped and that the behavior of the vehicle is determined to be a stable state, and may avoid stopping the engine in the case that the behavior of the vehicle is determined to be in an unstable state even when the vehicle is decelerated to or lower than the specified vehicle speed.

When braking force is applied to wheels so as to decelerate a vehicle on a low-$\mu$ road, for example, a vehicle behavior is apt to fall in an unstable state. According to the aspect, automatic stopping of an engine can be appropriately avoided in such a case.

According to another aspect of the present invention, there is also provided a vehicle drive control apparatus. The apparatus includes an engine start control unit which starts an engine when an automatic start condition for automatically starting the engine is satisfied during stopping of the engine and a behavior determination unit which determines whether a behavior of a vehicle is in a stable state or an unstable state. The engine start control unit starts the engine as the automatic start condition is satisfied when the behavior of the vehicle is determined to be in an unstable state during stopping of the engine.

When a vehicle is stopped on a low-µ inclined road, for example, there may be a case that the vehicle gradually slips down. When a vehicle behavior becomes unstable as mentioned above, there is a high possibility that control requiring power, such as EPS operation caused by driver's steering operation of a steering wheel, is performed. According to the aspect, by starting an engine when a vehicle behavior is in an unstable state as mentioned above, power can be appropriately supplied to equipment which requires power in a vehicle.

The behavior determination unit may determine whether the behavior of the vehicle is in a stable state or an unstable state based on a turning behavior of the vehicle.

When a vehicle slips down on a low-µ inclined road, a turning behavior of the vehicle is to be detected. Therefore, according to the aspect, a vehicle behavior can be appropriately determined whether to be in a stable state or to be in an unstable state.

Here, a steering assistance unit which assists steering force may be further provided. The engine start control unit may avoid starting the engine as the automatic start condition is not satisfied when steering force is assisted by the steering assistance unit even if the behavior of the vehicle is determined to be in an unstable state.

For example, when slipping down speed of a vehicle is gradually increasing, there is a high possibility that control requiring power, such as EPS operation caused by driver's steering operation of a steering wheel, is immediately performed. Here, in order to start an engine, relatively large power is necessary even in a fraction of a second. Therefore, when the engine is started during the EPS operation, unusual feeling can be provided to the driver during steering operation due to assistance force fluctuation of the EPS. According to the aspect, such unusual feeling can be suppressed so that an influence thereof to driver's steering feeling can be avoided.

According to the present invention, in a vehicle having an engine capable of being automatically stopped or started, it is possible to provide a state capable of appropriately supplying power to equipment which requires power even when a vehicle behavior is unstable.

BRIEF DESCRIPTION OF THE DRAWINGS

FIG. 9 is a table indicating determination criteria whether the vehicle behavior is in a stable state;

FIG. 10 is a table indicating determination criteria whether an unstable tendency of the vehicle is being increased;

FIG. 11 is a table indicating other emergency automatic start conditions; and

FIG. 12 is a view schematically illustrating the vehicle of which behavior becomes unstable due to slipping down from a stopped state.

DETAILED DESCRIPTION OF THE EMBODIMENTS

In the following, embodiment of the present invention (hereinafter called the present embodiment) will be described in detail with reference to the drawings.

Figure 1:
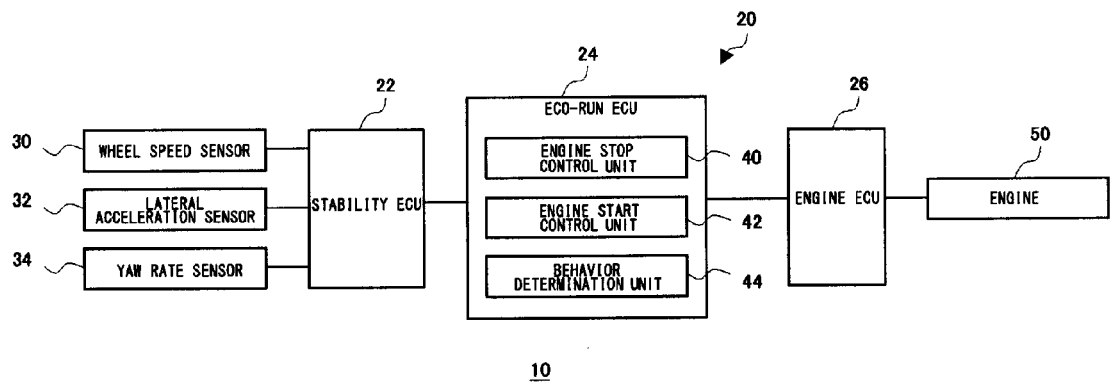
FIG. 1 is a functional block diagram schematically illustrating the configuration of a vehicle drive control apparatus mounted on a vehicle according to the first embodiment.

FIG. 1 is a functional block diagram schematically illustrating the configuration of a vehicle drive control apparatus 20 mounted on a vehicle 10 according to the first embodiment. The vehicle drive control apparatus 20 has an eco-run electronic control unit 24 (hereinafter, an electronic control unit is abbreviated to an ECU). The eco-run ECU 24 is connected to a stability ECU 22 and an engine ECU 26.

Each of the stability ECU 22, the eco-run ECU 24 and the engine ECU 26 includes a CPU to perform a variety of arithmetic processes, a ROM to store a variety of control programs, and a RAM to be utilized as a work area for data storing and program performing. In FIG. 1, the eco-run ECU 24 is illustrated with functional blocks which are performed in liaison of software and hardware such as the CPU, ROM and RAM. Accordingly, these functional blocks may be performed in a variety of manners by combinations of the software and hardware.

The vehicle 10 is provided with a wheel speed sensor 30, a lateral acceleration sensor 32 and a yaw rate sensor 34. The wheel speed sensor 30 is arranged corresponding to each of four wheels (not illustrated) disposed at the vehicle 10 so as to detect rotation speed of the corresponding wheel. The lateral acceleration sensor 32 detects acceleration applied to the vehicle 10 in the vehicle width direction. The yaw rate sensor 34 detects a yaw rate of the vehicle 10.

The stability ECU 22 is connected to the wheel speed sensor 30, the lateral acceleration sensor 32 and the yaw rate sensor 34 so as to obtain detection results respectively therefrom. The stability ECU 22 performs behavior stabilization control to stabilize a behavior of the vehicle 10 by utilizing the obtained detection results. Since such behavior stabilization control is known to the public, the description thereof is skipped.

The vehicle 10 is provided with an engine 50 of internal combustion as a drive source. The engine ECU 26 performs controlling start and stop of the engine 50 as well as controlling opening of a throttle valve and fuel injection amount by an injector which are disposed at the engine 50. Here, for example, instead of the engine 50, an electric motor and the like may be adopted as the drive source of the vehicle 10. The vehicle 10 may be a so-called hybrid vehicle which is driven in collaboration of the engine 50 and an electric motor.

The eco-run ECU 24 performs control to automatically stop or start the engine 50 for stopping idling operation during stopping of the vehicle 10 or the like. The eco-run ECU 24 includes an engine stop control unit 40, an engine start control unit 42 and a behavior determination unit 44.

The eco-run ECU 24 possesses automatic stop conditions for automatically stopping the engine 50 and automatic start conditions for automatically starting the engine 50. The engine stop control unit 40 stops the engine 50 when the automatic stop conditions are satisfied during operation of the engine 50. The engine start control unit 42 starts the engine 50 when the automatic start conditions are satisfied during stopping of the engine 50.

The behavior determination unit 44 determines whether a behavior of the vehicle 10 is in a stable state or an unstable state. Specifically, the behavior determination unit 44 obtains detection results of the wheel speed sensor 30, the lateral acceleration sensor 32 and the yaw rate sensor 34 via the stability ECU 22. Then, the behavior determination unit 44 determines whether the behavior of the vehicle 10 is in a stable state or an unstable state based on these detection results regarding a turning behavior of the vehicle 10. Specific criteria for the determination will be described below.

Figure 2:
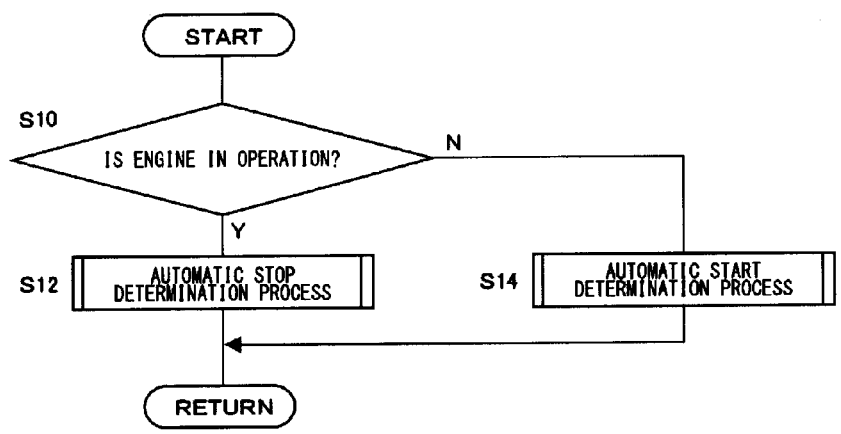
FIG. 2 is a flowchart illustrating procedure of an automatic stop/start process by the vehicle drive control apparatus.

FIG. 2 is a flowchart illustrating procedure of an automatic stop/start process by the vehicle drive control apparatus 20. The process in this flowchart is started when an ignition switch of the vehicle 10 is turned on and repeatedly performed every predetermined time thereafter.

The eco-run ECU 24 determines whether the engine 50 is in operation (S10). When the engine 50 is determined to be in operation ("Y" in S10), the engine stop control unit 40 performs an automatic stop determination process (S12). When the engine 50 is determined not to be in operation ("N" in S10), the engine start control unit 42 performs an automatic start determination process (S14).

Figure 3:
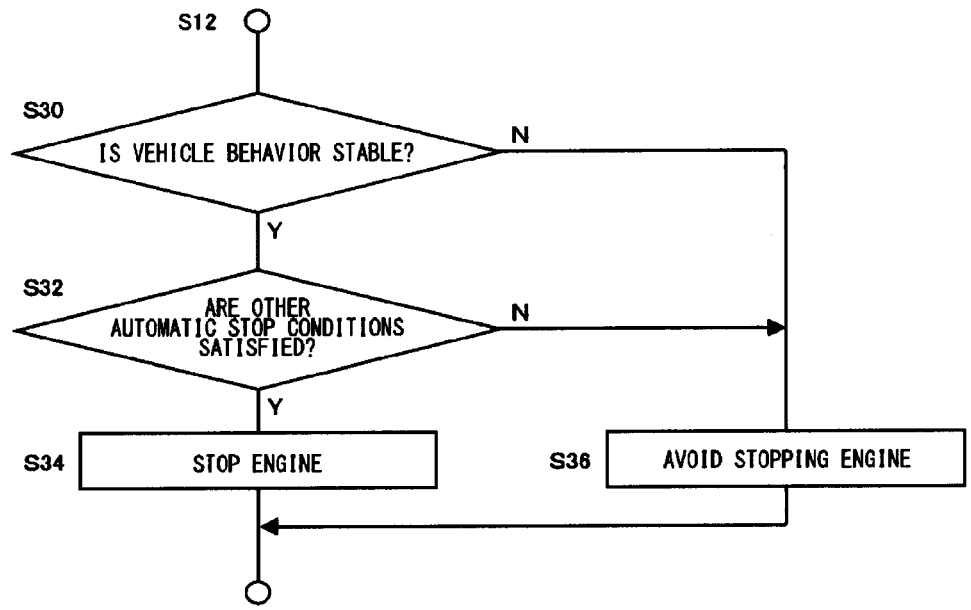
FIG. 3 is a flowchart illustrating detailed procedure of an automatic stop determination process of S12 in FIG. 2.

FIG. 3 is a flowchart illustrating detailed procedure of the automatic stop determination process of S12 in FIG. 2. When the automatic stop conditions for the engine 50 to be automatically stopped is satisfied, the engine stop control unit 40 stops the engine 50. When the conditions are not satisfied, the engine stop control unit 40 avoids stopping the engine 50 and continues the operation of the engine 50. In the present embodiment, the automatic stop conditions include the state that the behavior of the vehicle 10 is stable.

Accordingly, the behavior determination unit 44 determines whether the behavior of the vehicle 10 is in a stable state or an unstable state by utilizing the detection results of the lateral acceleration sensor 32 and the yaw rate sensor 34 (S30). When the behavior of the vehicle 10 is in an unstable state ("N" in S30), the engine stop control unit 40 avoids stopping the engine 50 and continues the operation of the engine 50 due to determination that the automatic stop conditions are not satisfied regardless of satisfaction of other automatic stop conditions. (S36).

When the behavior of the vehicle 10 is in a stable state ("Y" in S30), the engine stop control unit 40 determines whether the other automatic stop conditions are satisfied (S32). In the case of being satisfied ("Y" in S32), the engine stop control unit 40 stops the engine 50 (S34). In the case of not being satisfied ("N" in S32), the engine stop control unit 40 avoids stopping the engine 50 and continues the operation of the engine 50 (S36).

Figure 4:
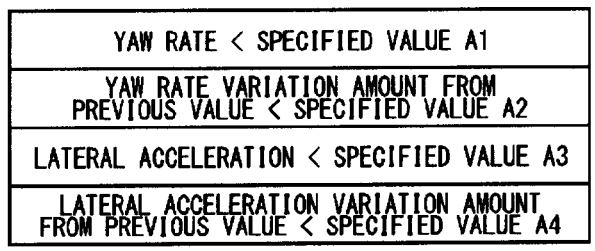
FIG. 4 is a table indicating determination criteria whether a vehicle behavior is in a stable state.

FIG. 4 is a table indicating the determination criteria whether the behavior of the vehicle 10 is in a stable state. When all of the conditions listed on respective rows of this table are satisfied, the behavior determination unit 44 determines the behavior of the vehicle 10 to be in a stable state. On the contrary, when any of the conditions listed on the respective rows of this table is not satisfied, the behavior determination unit 44 determines the behavior of the vehicle 10 to be in an unstable state.

Specifically, when all of the following conditions are satisfied, the behavior determination unit 44 determines the behavior of the vehicle 10 to be in a stable state. That is, the yaw rate detected by the yaw rate sensor 34 is smaller than a specified value A1, a yaw rate variation amount compared to the previous detection value detected by the yaw rate sensor 34 is smaller than a specified value A2, lateral acceleration detected by the lateral acceleration sensor 32 is smaller than a specified value A3, and a lateral acceleration variation amount compared to the previous detection value detected by the lateral acceleration sensor 32 is smaller than a specified value A4.

Figure 5:
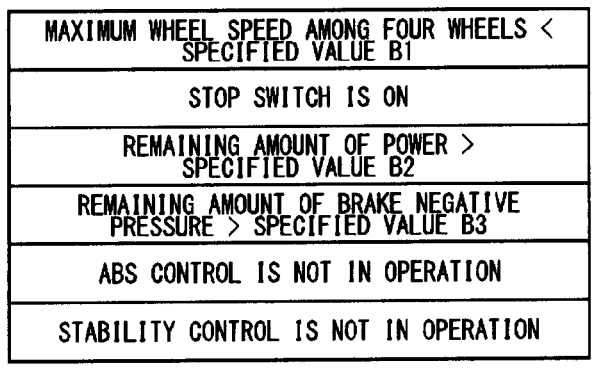
FIG. 5 is a table indicating other automatic stop conditions.

FIG. 5 is a table indicating the other automatic stop conditions in FIG. 3. When all of the conditions listed on respective rows of this table are satisfied, the engine stop control unit 40 determines that the other automatic stop conditions are satisfied. Specifically, the vehicle 10 includes a stop switch (not illustrated), a brake negative pressure sensor (not illustrated), a battery (not illustrated) and an ABS-ECU (not illustrated).

The stop switch is turned on when a brake pedal is depressed by a driver. The brake negative pressure sensor detects brake negative pressure to assist depressing force of the brake pedal. The eco-run ECU 24 obtains a signal indicating on-off of the stop switch and a detected signal of the brake negative pressure. The battery is connected to the eco-run ECU 24 as well and the eco-run ECU 24 monitors a remaining power amount of the battery at predetermined intervals. The ABS-ECU controls braking force applied to the wheels to avoid wheel locking. The eco-run ECU 24 is arranged to be capable of determining whether the ABS control is being performed by referring to a control flag and the like at the ABS-ECU.

When all of the following conditions are satisfied, the engine stop control unit 40 determines that the other automatic stop conditions are satisfied. That is, the maximum wheel speed among the four wheels is lower than a specified value B1, the stop switch is ON, the remaining amount of power is larger than a specified value B2, the remaining amount of the brake negative pressure is larger than a specified value B3, the ABS control is not in operation, and the stability control is not in operation. Accordingly, when the ABS control or the stability control being behavior control of the vehicle 10 is being performed by the stability ECU 22, the behavior determination unit 44 does not determine the behavior of the vehicle 10 to be in an unstable state.

Returning to FIG. 3, when the other automatic stop conditions are satisfied ("Y" in S32), the engine stop control unit 40 stops the engine 50 (S34). When the behavior of the vehicle 10 is not in a stable state ("N" in S30), the engine stop control unit 40 avoids stopping the engine 50 and continues the operation of the engine 50 (S36). When the other automatic stop conditions are not satisfied ("N" in S32), the engine stop control unit 40 avoids stopping the engine 50 and continues the operation of the engine 50 (S36).

Figure 6:
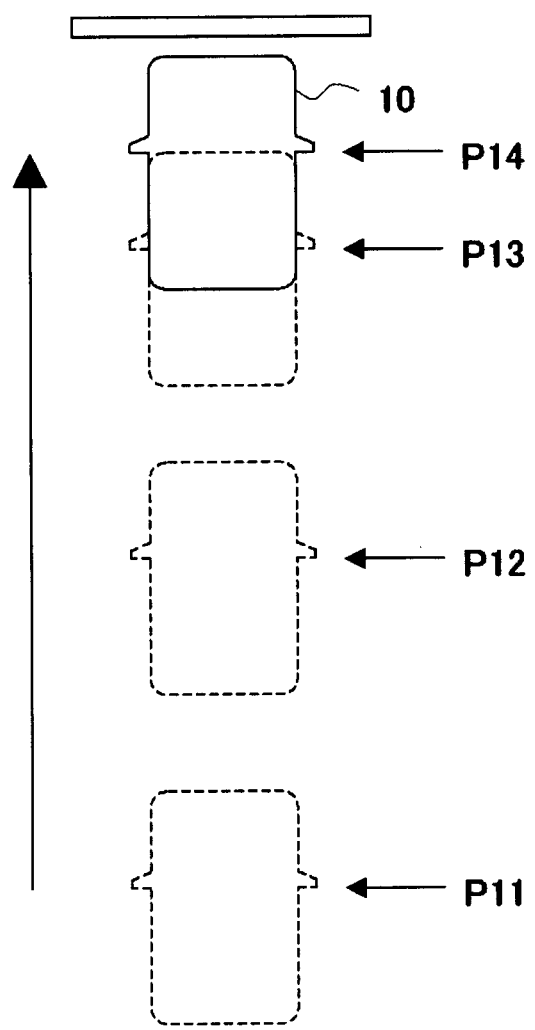
FIG. 6 is a view schematically illustrating the vehicle to be stopped while the behavior thereof remains in a stable state.

FIG. 6 is a view schematically illustrating the vehicle 10 to be stopped while the behavior thereof remains in a stable state. For example, in the case that a brake pedal is depressed by a driver at the first position P11 and the determination is performed at the second position P12 as the behavior of the vehicle 10 is in a stable state and the other automatic stop conditions are satisfied, the engine stop control unit 40 determines to stop the engine 50. The engine stop control unit 40 provides a signal of instructing to stop the engine 50 to the engine ECU 26. The engine ECU 26 stops the engine 50 at the third position P13 where the vehicle 10 is not completely stopped yet. Subsequently, the vehicle 10 is stopped at the fourth position P14.

As described above, in the case that the vehicle 10 is decelerated to or lower than a specified vehicle speed for automatically stopping the engine 50 and that the behavior of the vehicle 10 is determined to be in a stable state, the engine stop control unit 40 stops the engine 50. Accordingly, when the behavior of the vehicle 10 is stable, the engine 50 can be stopped before the vehicle 10 is stopped. Hence, it is possible to stop the engine 50 more quickly.

Figure 7:
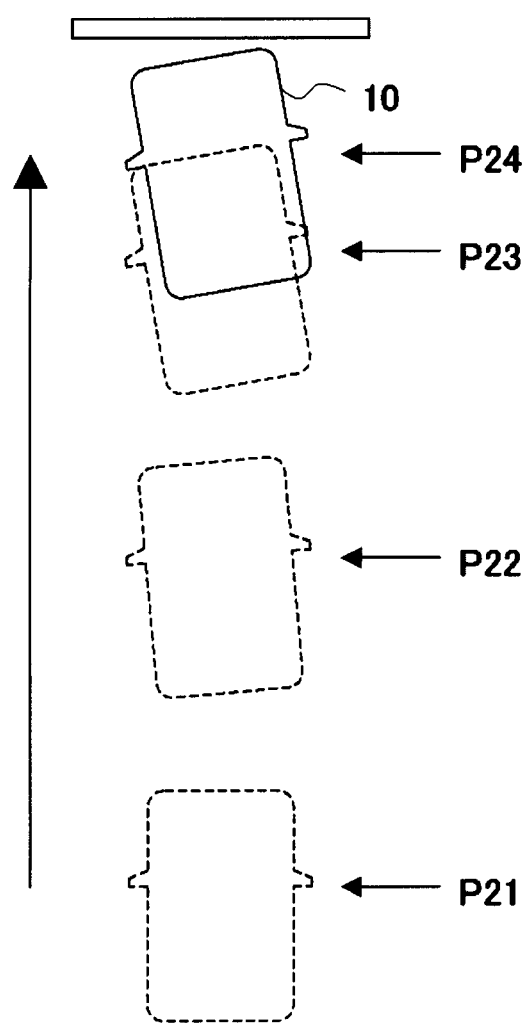
FIG. 7 is a view schematically illustrating the vehicle to be stopped in an unstable state of the behavior thereof.

FIG. 7 is a view schematically illustrating the vehicle 10 to be stopped in an unstable state of the behavior thereof. For example, in the case that the brake pedal is depressed by the driver at the first position P21 and the behavior of the vehicle 10 is determined to be in an unstable state at the second position P22, the engine stop control unit 40 determines to avoid stopping the engine 50 regardless of whether the other automatic stop conditions are satisfied. Accordingly, the engine stop control unit 40 continues the operation of the engine 50 even when the vehicle 10 proceeds to the third position P23 being a position just before stopping and proceeds to the fourth position P24 being a stop position.

In this manner, in the case that the behavior of the vehicle 10 is determined to be in an unstable state, the engine stop control unit 40 avoids stopping the engine 50 even when the vehicle 10 is decelerated to or lower than the specified vehicle speed. Here, the vehicle 10 is provided with an EPS to assist steering force of the driver. With the above configuration, appropriate steering assistance by the EPS can be continued.

Figure 8:
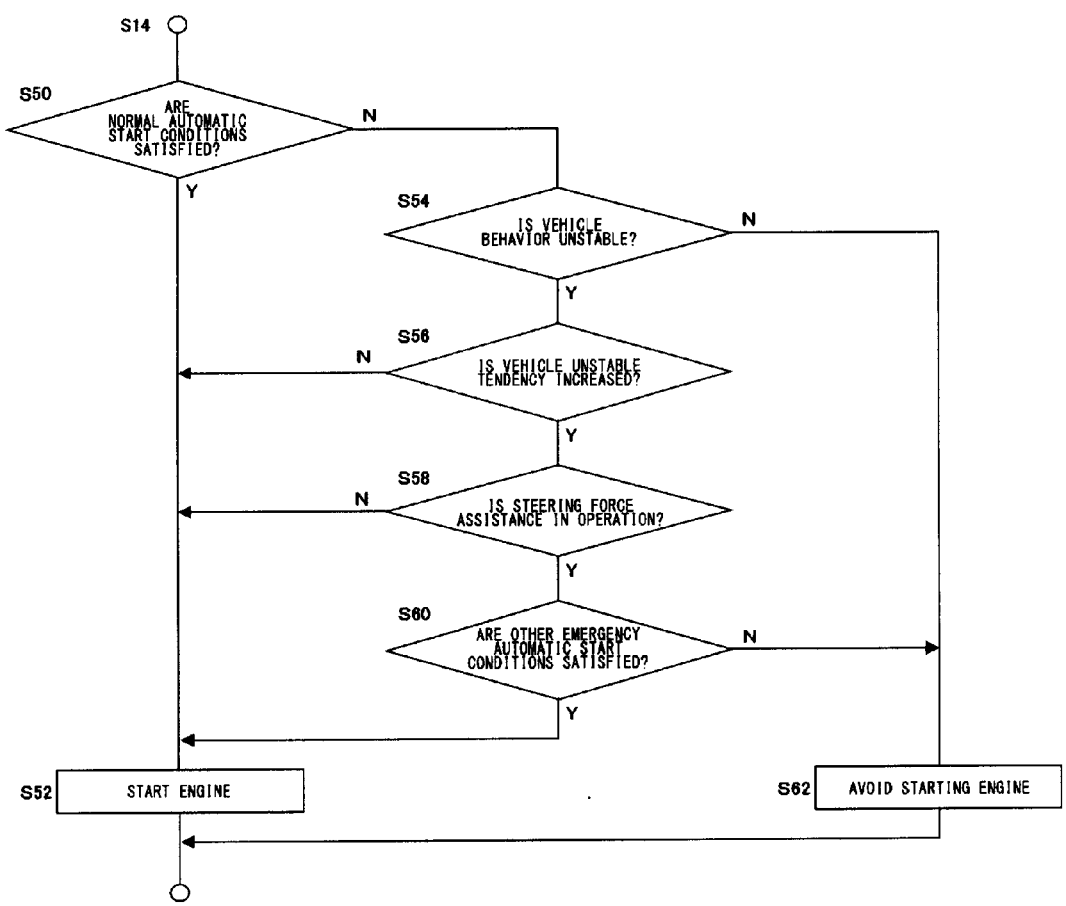
FIG. 8 is a flowchart illustrating detailed procedure of an automatic start determination process of S14 in FIG. 2.

FIG. 8 is a flowchart which describes detailed procedure of the automatic start determination process of S14 in FIG. 2. In the automatic start determination process, the engine 50 is started in the case of satisfying either of normal automatic start conditions or emergency automatic start conditions which are the automatic start conditions for automatically starting the engine 50.

Specifically, the engine start control unit 42 determines whether the normal automatic start conditions are satisfied (S50). The normal automatic start conditions include conditions in which the possibility to start the vehicle 10 is determined to be high, such as detection of depression releasing of a brake pedal and detection of shifting of a shift lever from a neutral (N) position to a drive (D) position. Since such normal automatic start conditions are known to the public, the description thereof will not be described. When the normal automatic start conditions are satisfied ("Y" in S50), the engine start control unit 42 starts the engine 50 (S52).

When the normal automatic start conditions are not satisfied ("N" in S50), the engine start control unit 42 determines whether the emergency automatic start conditions are satisfied. Specifically, first, the engine start control unit 42 determines whether the behavior of the vehicle 10 is in an unstable state (S54). When the behavior of the vehicle 10 in is a stable state ("N" in S54), the engine start control unit 42 determines that it is not necessary to urgently start the engine 50. Accordingly, the engine start control unit 42 avoids starting the engine 50 as the automatic start conditions are not satisfied and maintains the stopped state of the engine 50 (S62). When the behavior of the vehicle 10 is in an unstable state ("Y" in S54), the engine start control unit 42 determines whether the unstable tendency of the vehicle 10 is being increased (S56).

FIG. 9 is a table indicating the determination criteria whether the behavior of the vehicle 10 is in a stable state. In the case that all of the conditions listed on respective rows of this table are satisfied while the wheel speed of each of four wheels is zero, the behavior determination unit 44 determines that the behavior of the vehicle 10 is in a stable state. On the contrary, in the case that any of the conditions listed on the respective rows of this table is not satisfied even though the wheel speed of each of the four wheels is zero, there may be a possibility that the vehicle 10 is slipping down on a low-μ inclined road. Therefore, in this case, the behavior determination unit 44 determines the behavior of the vehicle 10 to be in an unstable state.

Specifically, when all of the following conditions are satisfied, the behavior determination unit 44 determines the behavior of the vehicle 10 to be in a stable state. That is, the yaw rate detected by the yaw rate sensor 34 is smaller than a specified value C1, a yaw rate variation amount compared to the previous detection value detected by the yaw rate sensor 34 is smaller than a specified value C2, lateral acceleration detected by the lateral acceleration sensor 32 is smaller than a specified value C3, and a lateral acceleration variation amount compared to the previous detection value detected by the lateral acceleration sensor 32 is smaller than a specified value C4. Here, the specified values C1 to C4 are set to be different from the above specified values A1 to A4. However, one or more of the specified values C1 to C4 may be the same value as the specified values A1 to A4.

FIG. 10 is a table indicating the determination criteria whether the unstable tendency of the vehicle 10 is being increased. When any of the conditions listed on respective rows of this table is satisfied, the behavior determination unit 44 determines that the unstable tendency of the vehicle 10 is being increased. Specifically, when the yaw rate detected by the yaw rate sensor 34 is increased compared to the previous value or when the lateral acceleration detected by the lateral acceleration sensor 32 is increased compared to the previous value, the behavior determination unit 44 determines that the unstable tendency of the vehicle 10 is being increased.

Returning to FIG. 8, when the unstable tendency of the vehicle 10 is not being increased ("N" in S56), the engine start control unit 42 starts the engine 50 (S52). When the unstable tendency of the vehicle 10 is being increased ("Y" in S56), the engine start control unit 42 determines whether the steering force assistance is being performed by the EPS (S58). When the steering force assistance is not being performed ("N" in S58), the engine start control unit 42 starts the engine 50 (S52).

When the steering force assistance is being performed ("Y" in S58), the engine start control unit 42 determines whether other emergency automatic start conditions are satisfied (S60). When the other emergency automatic start conditions are satisfied ("Y" in S60), the engine start control unit 42 starts the engine 50 (S52). When the other emergency automatic start conditions are not satisfied ("N" in S60), the engine start control unit 42 avoids starting the engine 50 and maintains the stopped state of the engine 50 (S62).

In this manner, in the case that the behavior of the vehicle 10 is determined to be in an unstable state during stopping of the engine 50, the engine start control unit 42 starts the engine 50 as the automatic start conditions are satisfied. On the other hand, in the case that the steering force is assisted by the EPS even though the behavior of the vehicle 10 is determined to be in an unstable state, the engine start control unit 42 avoids starting the engine 50 as the automatic start conditions are not satisfied.

FIG. 11 is a table indicating the other emergency automatic start conditions. When any of the conditions listed on respective rows of this table is satisfied, the engine start control unit 42 determines that the other emergency automatic start conditions are satisfied. Specifically, when the remaining amount of power is equal to or smaller than a specified value D1 or the remaining amount of the brake negative pressure is equal to or smaller than a specified value D2, the engine start control unit 42 determines that the other emergency automatic start conditions are satisfied.

FIG. 12 is a view schematically illustrating the vehicle 10 of which behavior becomes unstable due to slipping down from a stopped state. In FIG. 12, it is assumed that the vehicle 10 has been stopped on a low-μ uphill road such as an ice-covered road at the first position P31. On a low-μ inclined road, there is a possibility that the vehicle slips down while the wheels are locked.

For example, it is assumed that the behavior of the vehicle 10 is determined to be in an unstable state at the second position P32 while the value satisfying the conditions in FIG. 9 is detected by the yaw rate sensor 34 or the lateral acceleration sensor 32 even though the wheel speed of each of four wheels is zero. In the case that the driver who feels an unstable behavior state steers a wheel steering to cause the operational force assistance of the EPS performed in order to correct an attitude of the vehicle 10, the engine start control unit 42 avoids starting the engine 50 in order to avoid unusual steering feeling due to power consumption required for starting the engine 50. After the attitude of the vehicle 10 is corrected at the third position P33 and operational force assistance by the EPS is completed due to completion of the wheel steering operation by the driver, the engine start control unit 42 starts the engine 50.

The present invention is not limited to the above embodiment. Appropriate combination of each configuration of the present embodiment is also effective as an embodiment of the present invention. In addition, it is also possible to apply modification such as various design changes to the present embodiment based on knowledge of skilled persons. The embodiment to which such a modification is applied may be included in the scope of the present invention.

What is claimed is:

1. A vehicle drive control apparatus comprising:
an electronic control unit including
an engine stop control unit which stops an engine when an automatic stop condition for automatically stopping the engine is satisfied during operation of the engine, and
a behavior determination unit which determines whether a behavior of a vehicle is in a stable state or an unstable state based on a difference between a current yaw rate measurement and a previous yaw rate measurement, wherein
the engine stop control unit avoids stopping the engine when the behavior of the vehicle is determined to be in the unstable state, the automatic stop condition not being satisfied when the behavior of the vehicle is determined to be in an unstable state during operation of the engine,
the behavior determination unit determines whether the behavior of the vehicle is in a stable state or an unstable state based on a turning behavior of the vehicle,
the vehicle includes a lateral acceleration sensor and a yaw rate sensor to determine the turning behavior of the vehicle, and
stability of the vehicle is determined when a yaw rate variation amount compared to a previous detection value detected by the yaw rate sensor is smaller than a predetermined threshold.

2. The vehicle control apparatus according to claim 1, wherein stability of the vehicle is determined when a lateral acceleration variation amount compared to a previous detection value detected by the lateral acceleration sensor is smaller than a predetermined threshold.

3. The vehicle control apparatus according to claim 2, wherein the vehicle is determined to be in an unstable state when a current lateral acceleration is above a predetermined lateral acceleration threshold, the current yaw rate measurement is above a predetermined yaw threshold, or a difference between the current lateral acceleration and a previous lateral acceleration is above a second predetermined threshold.

4. A vehicle drive control apparatus comprising:
an electronic control unit including
an engine stop control unit which stops an engine when an automatic stop condition for automatically stopping the engine is satisfied during operation of the engine, and
a behavior determination unit which determines whether a behavior of a vehicle is in a stable state or an unstable state based on a difference between a current yaw rate measurement and a previous yaw rate measurement, wherein
the engine stop control unit avoids stopping the engine when the behavior of the vehicle is determined to be in the unstable state, the automatic stop condition not being satisfied when the behavior of the vehicle is determined to be in an unstable state during operation of the engine,
the behavior determination unit determines whether the behavior of the vehicle is in a stable state or an unstable state based on a turning behavior of the vehicle,
the vehicle includes a lateral acceleration sensor and a yaw rate sensor to determine the turning behavior of the vehicle, and
wherein stability of the vehicle is determined when a yaw rate variation amount compared to a previous detection value detected by the yaw rate sensor is smaller than a predetermined threshold, the vehicle is determined to be in an unstable state when a current lateral acceleration is above a predetermined lateral acceleration threshold, the current yaw rate measurement is above a predetermined yaw threshold, and a difference between the current lateral acceleration and a previous lateral acceleration is above a second predetermined threshold.

* * * * *